US009004509B2

(12) United States Patent  
Smith et al.

(10) Patent No.: US 9,004,509 B2  
(45) Date of Patent: Apr. 14, 2015

(54) TRANSPORT CART WITH TILTING LOAD CARRIER

(75) Inventors: Timothy Smith, Sharpsburg, GA (US); James M. Hill, Ramsey, NJ (US)

(73) Assignee: Cartovators, LLC., Sharpsburg, GA (US)

( * ) Notice: Subject to any disclaimer, the term of this patent is extended or adjusted under 35 U.S.C. 154(b) by 309 days.

(21) Appl. No.: 13/407,024

(22) Filed: Feb. 28, 2012

(65) Prior Publication Data

US 2013/0221631 A1     Aug. 29, 2013

(51) Int. Cl.
*B62B 3/08*            (2006.01)
*B62B 3/10*            (2006.01)

(52) U.S. Cl.
CPC .............. *B62B 3/108* (2013.01); *B62B 2203/07* (2013.01)

(58) Field of Classification Search
CPC ............ B62B 3/00; B62B 3/002; B62B 3/04; B62B 3/06; B62B 3/0612; B62B 3/0637; B62B 3/0643; B62B 3/08; B62B 3/10; B62B 3/102; B62B 3/108; B62B 2203/07; B62B 2203/10; B62B 2203/70
USPC .............. 280/6.151, 79.3, 79.7; 414/419, 421
See application file for complete search history.

(56) References Cited

U.S. PATENT DOCUMENTS

| | | | |
|---|---|---|---|
| 236,683 A | 1/1881 | Leyburn | |
| 322,499 A | 7/1885 | Stevens | |
| 421,204 A | 2/1890 | Stecher | |
| 507,483 A * | 10/1893 | Cardarelli | 414/634 |
| 615,448 A | 12/1898 | Hafner | |
| 708,346 A | 9/1902 | Grondin | |
| 1,425,999 A | 8/1922 | Morrow | |
| 1,577,954 A | 3/1926 | Chvojka | |
| 1,636,043 A | 7/1927 | Chvojka | |
| 1,697,364 A * | 1/1929 | McCollum et al. | 414/678 |
| 1,719,197 A * | 7/1929 | Schlothan | 254/3 C |
| 2,011,627 A * | 8/1935 | Graham | 254/3 C |
| 2,335,692 A * | 11/1943 | Murray | 414/346 |
| 2,881,865 A | 4/1959 | Lewis | |
| 3,191,786 A | 6/1965 | Langrell | |
| 3,540,753 A | 11/1970 | Hanson | |
| 3,923,167 A * | 12/1975 | Blankenbeckler | 414/11 |
| 4,632,627 A | 12/1986 | Swallows | |
| 5,277,439 A * | 1/1994 | Pipes et al. | 280/47.2 |
| 5,456,571 A * | 10/1995 | Schoenherr et al. | 414/800 |
| 5,762,348 A | 6/1998 | Echternacht | |
| 6,341,788 B1* | 1/2002 | Ciccone | 280/47.28 |
| 6,368,048 B2* | 4/2002 | Womble et al. | 414/590 |
| 6,379,097 B1* | 4/2002 | Vondenhuevel et al. | 414/414 |
| 6,481,694 B2* | 11/2002 | Kozak | 254/325 |
| 7,017,998 B2* | 3/2006 | Ducharme | 298/2 |

(Continued)

*Primary Examiner* — Katy M Ebner

(74) *Attorney, Agent, or Firm* — Greer, Burns & Crain, Ltd.

(57) ABSTRACT

A transport cart includes a cart frame with wheels. A load carrier has bottom and side walls and an end wall structure at a first end, opposite a second end. A pivot axle is arranged between the cart frame and the load carrier so the load carrier pivots about a single axis. An interfering stop structure on the cart frame and the load carrier prevents pivotal movement of the load carrier beyond a predetermined angle. The pivot axle is arranged offset relative to a center of gravity of the load carrier. A force applying device provides a pulling force on the load carrier to pivot the load carrier relative to the cart frame. An arrest mechanism may be provided to arrest pivotal movement of the load carrier in a direction opposite of the pulling force, unless the arrest mechanism is released by a user of the transport cart.

19 Claims, 4 Drawing Sheets

(56) References Cited

U.S. PATENT DOCUMENTS

| | | | |
|---|---|---|---|
| 7,048,258 B1 * | 5/2006 | Dromgool et al. | 254/332 |
| 7,497,448 B2 * | 3/2009 | Brown | 280/47.34 |
| 7,628,408 B2 | 12/2009 | Kolesa et al. | |
| 8,104,787 B2 * | 1/2012 | Haley | 280/639 |
| 8,353,524 B2 * | 1/2013 | Gonzalez | 280/654 |
| 8,366,084 B2 * | 2/2013 | Halladay | 269/17 |
| 2003/0053898 A1 * | 3/2003 | Wamsley | 414/494 |
| 2003/0127834 A1 | 7/2003 | Click | |
| 2007/0145722 A1 * | 6/2007 | Lin et al. | 280/645 |

\* cited by examiner

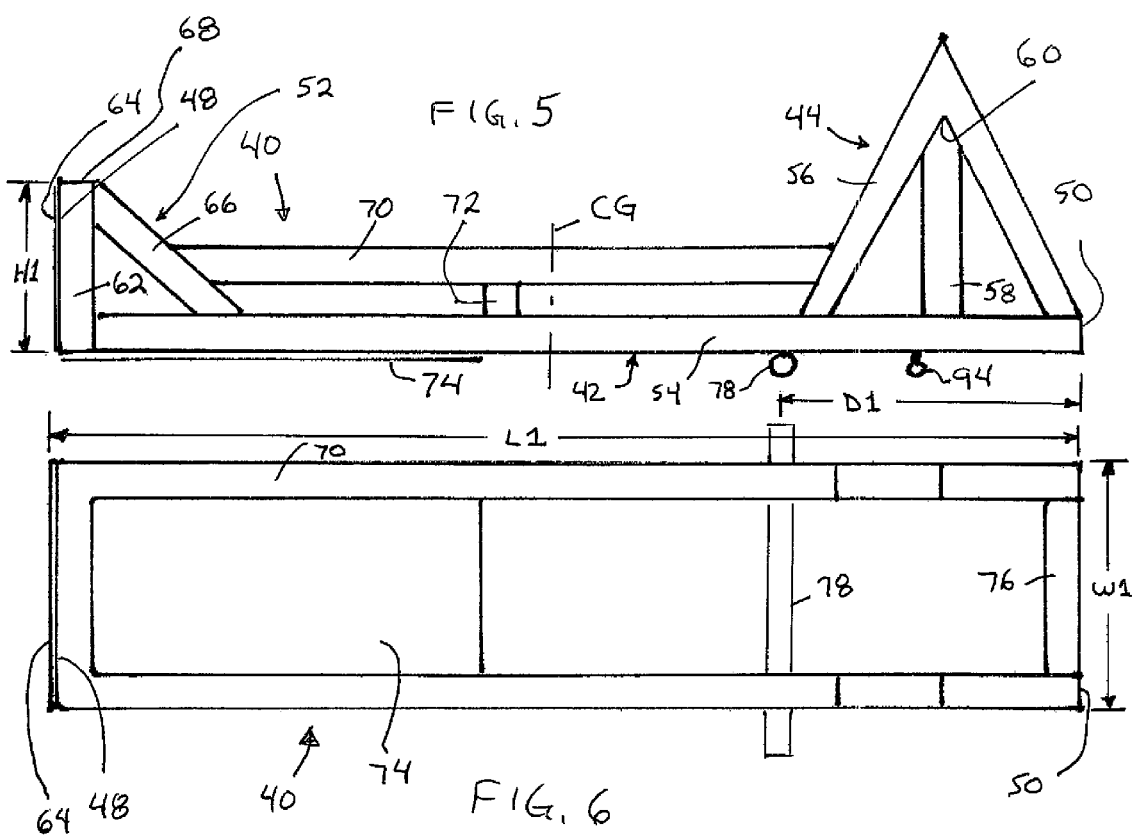

TRANSPORT CART WITH TILTING LOAD CARRIER

BACKGROUND OF THE INVENTION

The present invention relates generally to transport carts used to move objects, such as manually pushed rolling carts and powered carts. More particularly, the present invention relates to improvements in such carts that allows a load carrier portion of the cart to be tilted.

The use of carts for transporting materials is well known. There have been various constructions devised for transporting materials on wheeled carts, and for providing a way to change the orientation of the materials being transported, either between pick-up and transport of the materials, or during transport.

For example, published U.S. Patent Application 2003/0127834 discloses a drywall cart that includes a wheeled cart frame and a drywall tubing frame that is attached to the cart frame via a ball joint so that it swivels or rotates about a number of axes. A crank mechanism is provided to raise or lower the drywall tubing frame relative to the cart frame, but the user must manually swivel the drywall tubing frame relative to the cart frame.

U.S. Pat. No. 5,762,348 discloses a carriage with a wheeled base and an articulated frame for supporting a construction panel in a multitude of operator defined orientations during transportation, fitting and installation of the panel.

Other carts and hand trucks, and similar constructions are shown in U.S. Pat. Nos. 3,540,753, 3,191,786, 1,636,043, 1,577,954, 1,425,999, 708,346, 322,499, and 236,683.

Despite the teachings in these various patents, there is a need for an improved transport cart that permits a load to be carried on the cart and rotated between a horizontal position and an angled position to accommodate differences in the area through which the load is being transported. The change in orientation of the load needs to be easily accomplished by the user, with safeguards to prevent unwanted movement of the load, or movement beyond a desired position. The cart should also accommodate different numbers and sizes of the items making up the load to be transported.

SUMMARY OF THE INVENTION

The above-listed needs are met or exceeded by the present transport cart disclosed herein. In an embodiment, the transport cart includes a cart frame with wheels for engaging the ground. A load carrier includes a bottom and perhaps a side wall structure for supporting a load of materials to be transported by the transport cart and an end wall structure at a first end of the load carrier, opposite a second end of the load carrier, also for supporting the load of materials.

A pivot axle is arranged transversely between the cart frame and the load carrier to permit the load carrier to pivot relative to the cart frame about a single axis. An interfering stop structure is arranged on the cart frame and the load carrier to prevent pivotal movement of the load carrier in one direction relative to the cart frame beyond a predetermined angle so that the load carrier will not move to an unwanted position. The load carrier has a center of gravity located between the first and second ends and the pivot axle is arranged on the load carrier, relative to the center of gravity, towards the second end of the load carrier.

A force applying device is arranged between the cart frame and the load carrier to selectively provide a pulling force on the load carrier between the pivot axle and the second end of the load carrier and towards the cart frame. The pulling force from the force applying device will cause the load carrier to pivot relative to the cart frame upon the application of a predetermined amount of force. The force applying device may include an arrest mechanism arranged to arrest pivotal movement of the load carrier relative to the cart frame in a direction opposite of the pulling force, unless the arrest mechanism is specifically released by a user of the transport cart.

In an embodiment of the invention, the load carrier bottom and side walls are formed by open frame members.

In an embodiment of the invention, the end wall structure at the first end of the load carrier includes a plate extending between frame members of the load carrier.

In an embodiment of the invention, the second end of the load carrier is open to accommodate load articles having a length longer than the load carrier.

In an embodiment of the invention, the pivot axle is welded to one of the cart frame and the load carrier.

In an embodiment of the invention, the interfering stop comprises a frame element of the cart frame and a frame element of the load carrier which engage upon a pivoting of the load carrier relative to the cart frame when the first end of the load carrier moves downwardly toward one end of the cart frame.

In an embodiment of the invention, the load carrier is pivotable between a horizontal position and an angled position where the first end of the load carrier is lower than the second end of the load carrier.

In an embodiment of the invention, the force applying device includes a winch mounted on the cart frame and a cable extending from the winch to the load carrier.

In an embodiment of the invention, the winch is manually operated by means of a crank.

In an embodiment of the invention, the winch includes a ratchet gear and pawl to allow for one way rotation of the winch and to arrest reverse rotational movement of the winch.

In an embodiment of the invention, the cart frame includes two spaced apart side structures and the load carrier is sized to nest between the side structures of the cart frame in some rotational positions of the load carrier relative to the cart frame.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures in which like reference numerals identify like elements, and in which:

FIG. 5 is a side elevational view of the load carrier portion of the cart shown in isolation.

FIG. 6 is a plan view of the load carrier portion of FIG. 5 shown in isolation.

DETAILED DESCRIPTION OF THE PREFERRED EMBODIMENTS

Figure 1:
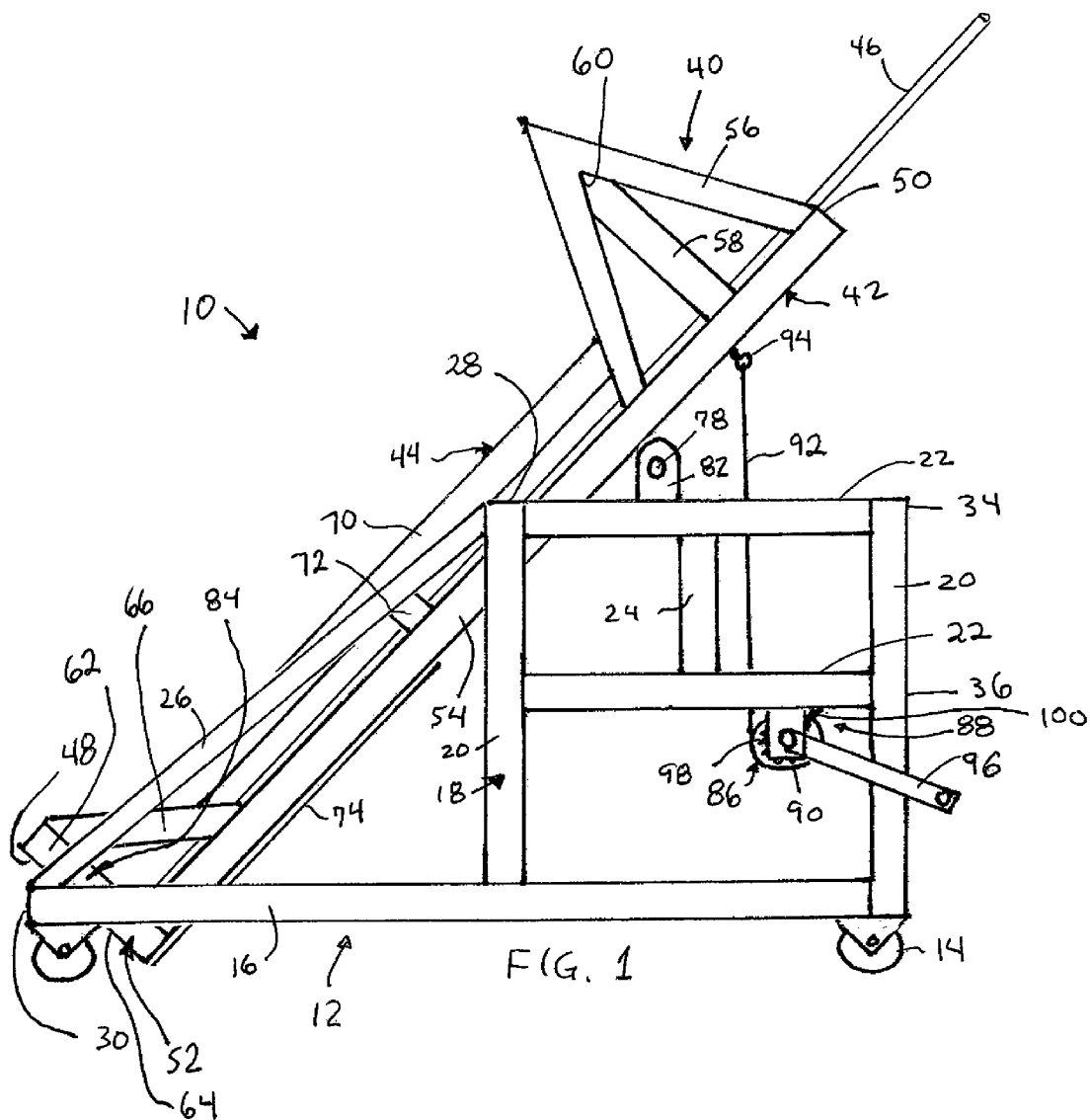
FIG. 1 is a side elevational view of a transport cart embodying the principles of the present invention, with the load carrier portion of the cart in a downwardly angled position.

Referring now to FIGS. 1-5, a transport cart 10 is illustrated and includes a cart frame 12 having wheels 14 for engaging the ground. Some or all of the wheels 14 may be fixed in position, or may be able to swivel around vertical axes. In some embodiments, the wheels 14 may be relatively small, located wholly under the cart frame 12, while in other embodiments, some or all of the wheels may have a larger diameter, and may be mounted on axles such that the wheels are positioned outboard of the cart frame 12.

While the cart frame 12 (FIGS. 1-4) may be embodied in many different forms, in the illustrated embodiment, the cart frame includes two bottom rails 16 on which are secured two side support structures 18. The side support structures 18 comprise two vertical frame members 20 and two horizontal frame members 22 connecting the two vertical frame members. A secondary vertical support frame member 24 is positioned between the two horizontal frame members 22. An angled frame member 26 connects a top 28 of the front vertical frame members 20 located near a middle of the bottom rail 16 to a front end 30 of the bottom rail and cart frame 12. A horizontal back frame member 32 (FIG. 4) connects a top 34 of the rear vertical frame members 20 at a rear end 36 of the cart frame 12. A horizontal bottom frame member 37 (FIG. 4) connects the two bottom rails 16 near the rear end 36 of the cart frame 12, and a horizontal front frame member 38 (FIG. 4) connects the two bottom rails at the front end 30 of the cart frame.

The transport cart 10 also includes a load carrier 40 (FIGS. 1-2, 5-6) having bottom 42 and side 44 wall structures for supporting a load of materials 46 to be transported by the transport cart. The load carrier 40 also includes a first end 48 and a second end 50, with an end wall structure 52 at the first end 48. While the load carrier 40 may be embodied in many different forms, in the illustrated embodiment, the load carrier includes two bottom rails 54 on which are secured the two side wall structures 44. The side wall structures 44 include two inverted V-shaped frame members 56 secured to the bottom rails 54 and positioned near the second end 50 of the load carrier 40, each with a vertical center support 58 extending from the vertex 60 of the V to the associated bottom rail 54. The end wall structure 52 includes two vertical frame members 62 extending at right angles from the bottom rails 54 and a plate 64 secured to the vertical frame members 62 and extending between them along the height of the vertical frame members. A pair of angled side supports 66 extend between the bottom rails 54 and the tops 68 of the vertical frame members 62. Finally, side rails 70 extend from the angled side supports 66 to the inverted V-shaped frame members 56, parallel to the bottom rails 54. A short vertical support 72 may be provided along the length of the side rails 70, between the side rails and the bottom rails 54, as needed or desired. A plate 74 is secured to the bottom rails 54 to form a portion of the bottom wall structure 42, along with a cross frame member 76 (FIG. 6) extending between the bottom rails 54 at the second end 50.

Figure 2:
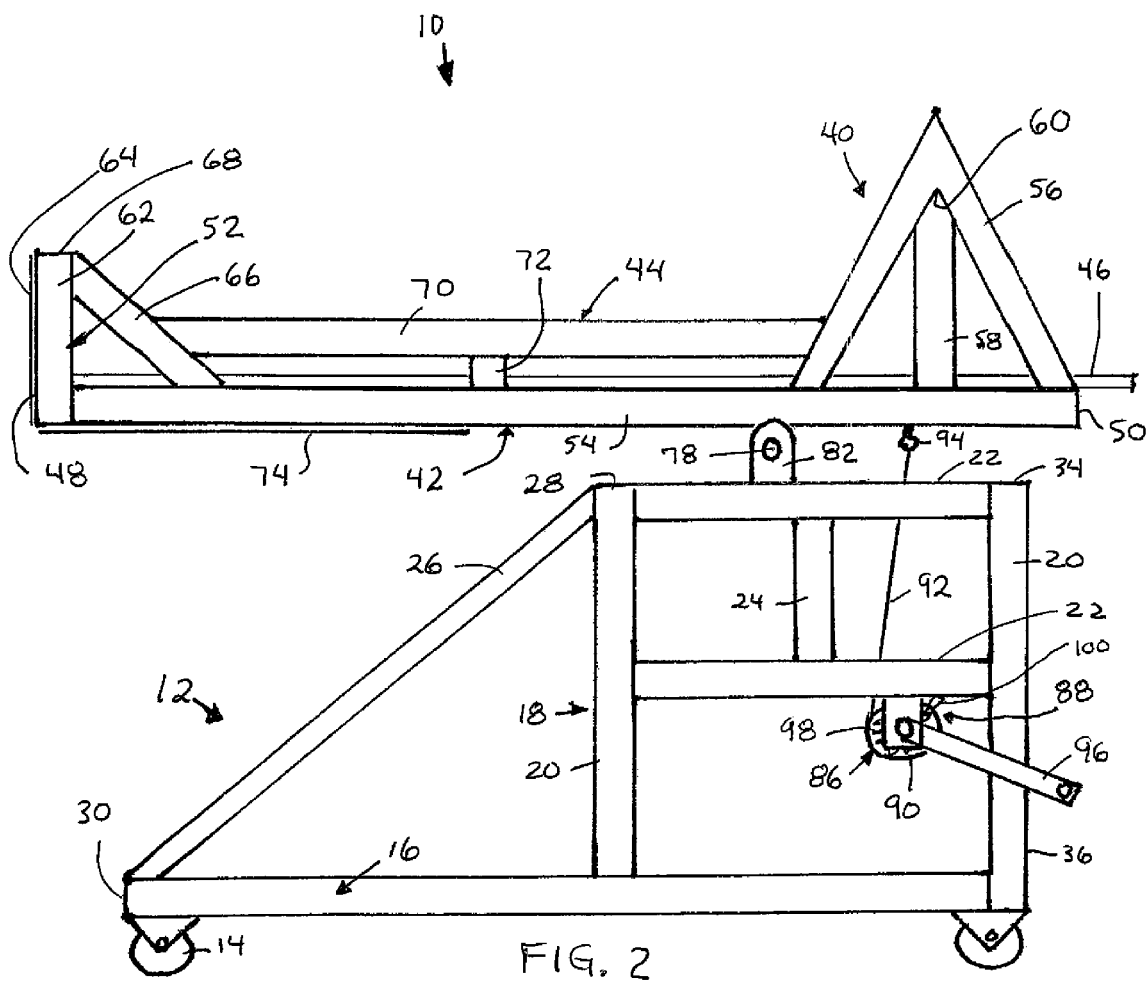
FIG. 2 is a side elevational view of a transport cart embodying the principles of the present invention, with the load carrier portion in the cart in a horizontal position.
Figure 3:
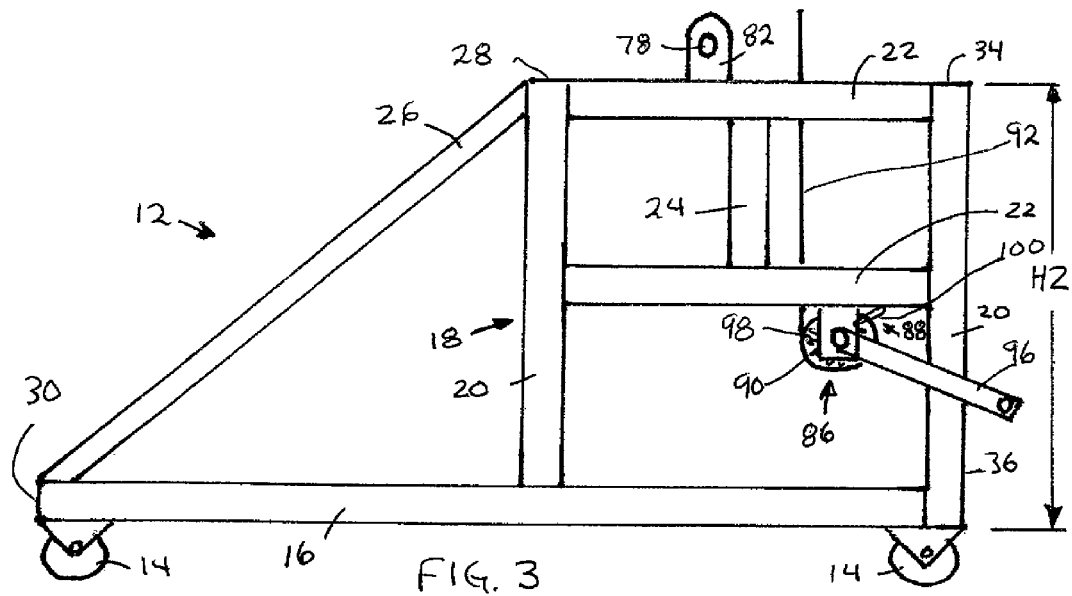
FIG. 3 is a side elevational view of the cart frame portion of the cart shown in isolation.
Figure 4:
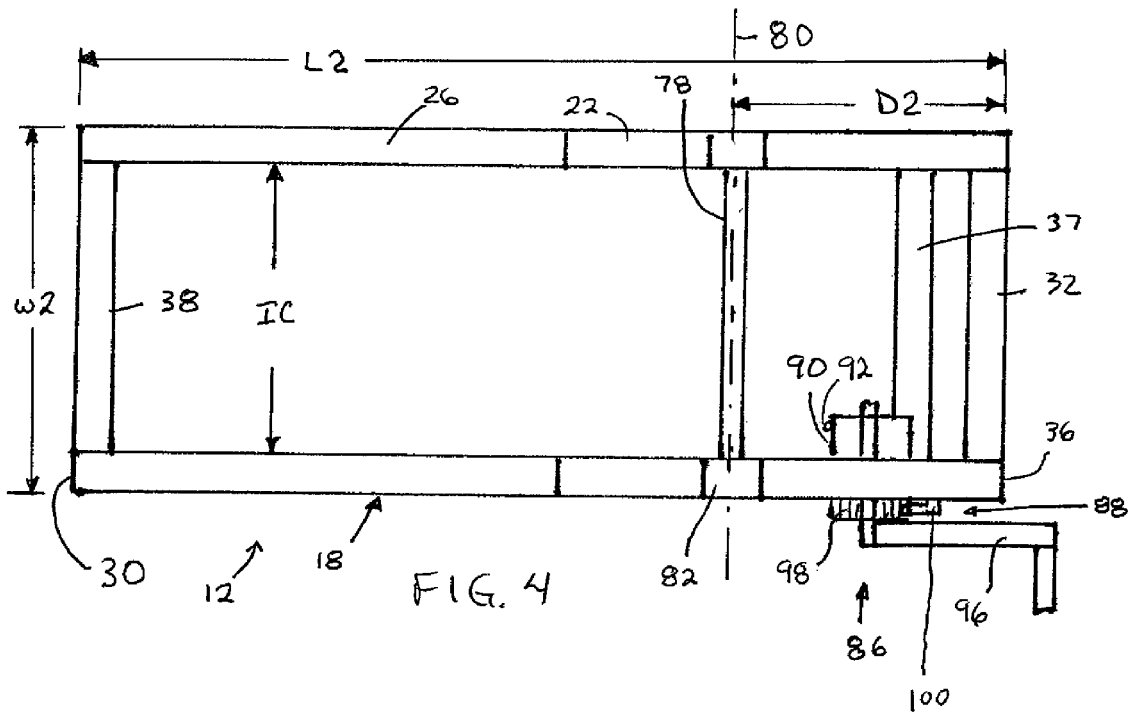
FIG. 4 is a plan view of the cart frame portion of FIG. 3 shown in isolation.

A single pivot axle 78 is arranged transversely between the cart frame 12 and the load carrier 40 to permit the load carrier to pivot relative to the cart frame about a longitudinal axis 80 (FIG. 4) of the pivot axle. The pivot axle 78 may be permanently attached, such as by welding, to one of the cart frame 12 or the load carrier 40. For example, the pivot axle 78 may be welded to the bottom rails 54 of the bottom wall structure 42 of the load carrier 40 and may be journaled in upstanding ears 82 welded to the top horizontal frame members 22 of the cart frame 12 as shown in FIGS. 1 and 2. Alternatively, the pivot axle 78 may be welded to the top horizontal frame members 22 of the cart frame 12 and received in ears welded to the bottom rails 54 of the bottom wall structure 42 of the load carrier 40. The ears 82 may include bearings to reduce rotational friction between the pivot axle 78 and the ears.

An interfering stop structure 84 (FIG. 1) may be arranged on the cart frame 12 and on the load carrier 40 to prevent pivotal movement of the load carrier in one direction relative to the cart frame beyond a predetermined angle. The interfering stop structure 84 may include a frame element of the cart frame 12 and a frame element of the load carrier 40 which engage each other upon a pivoting of the load carrier relative to the cart frame when the first end 48 of the load carrier moves downwardly toward the front end 30 of the cart frame. For example, in FIG. 1, the plate 64 of the end wall structure 52 of the load carrier 40 engages with the horizontal front frame member 38 (FIG. 4) of the cart frame 12 such that the load carrier 40 will not engage with the ground, and will also be stopped before the load carrier rotates to a full upright or vertical position.

The load carrier 40 has a center of gravity CG (FIG. 5) located between the first end 48 and the second end 50 and the pivot axle 78 may be arranged on the load carrier 40, relative to the center of gravity, towards the second end of the load carrier. In this manner, the first end 48 of the load carrier 40 will tend to move downwardly relative to the second end 50 of the load carrier under the influence of gravity.

A force applying device 86 is arranged between the cart frame 12 and the load carrier 40 to provide a pulling force on the load carrier between the pivot axle 78 and the second end 50 of the load carrier and towards the cart frame. In this manner, the force applying device 86 will cause the load carrier 40 to pivot relative to the cart frame 12 upon the application of a predetermined amount of force. The force applying device 86 may include an arrest mechanism 88 arranged to arrest pivotal movement of the load carrier 40 relative to the cart frame 12 in a direction opposite of the pulling force, unless the arrest mechanism is specifically released by a user of the transport cart 10. The force applying device 86 could alternately be arranged to supply a pushing force against the load carrier 40 between the pivot axle 78 and the first end 48 of the load carrier and away from the cart frame 12.

The force applying device 86, in one embodiment, may include a winch 90 which is mounted on the cart frame 12 and which has a cable 92 extending from the winch to a mounting bracket or eye 94 on one of the bottom rails 54 of the load carrier 40. In this arrangement, the cable 92 remains in tension at all times due to the continuous gravitational force on the first end 48 side of the pivot axle 78. The winch 90 may be manually operated by means of a crank 96 or may be operated by a motor, including a reversible motor. The winch 90 may include a ratchet gear 98 and releasable pawl 100 to allow for one way rotation of the winch, unless the user releases the pawl.

The load carrier bottom 42 and side 44 wall structures may be formed by open frame members, such as square metal tubing. Other materials can be used, depending on the application and load, such as angle iron or solid metal bar stock. Wood or plastic materials may also be used in some applications. In an embodiment, the second end 50 of the load carrier 40 has no end wall, such that the load of materials 46 may extend beyond the second end, as shown in FIGS. 1 and 2.

The load carrier 40 is preferably free to pivot between a horizontal position (FIG. 2) and an angled position (FIG. 1) where the first end 48 of the load carrier is lower than the second end 50 of the load carrier. In such an arrangement, the load of materials 46 will be supported on the end wall structure 52 of the load carrier, as well as on the bottom wall structure 42 of the load carrier.

A particular embodiment of the transport cart 10 has been constructed to facilitate movement of pipes and conduit used in construction. In this embodiment, the material being moved is typically about 10 feet in length and may require being moved in a horizontal position at some times due to ceiling heights that are lower than 10 feet, and a more vertical position at other times, such as to be positioned in an elevator where the walls of the elevator are less than 10 feet apart, but the ceilings will accommodate the angled height of the load. With an angled position of about 45 degrees for the load carrier, the height of the top end of the 10 feet long load of materials can be less than 8 feet.

In this particular embodiment, it has been found useful to construct the load carrier 40 with an overall length L1 (FIG. 6) of about 8 feet. The ends of the pipes or conduit will extend beyond the second open end 50 of the load carrier 40, as shown in FIGS. 1 and 2. A practical width W1 (FIG. 6) for the load carrier 40 may be around 26 to 28 inches, depending on the material used for the cart frame 12. A height H1 (FIG. 5) of the end wall structure 52 of about 20 inches allows for a substantial load of material to be accommodated in the load carrier 40. The pivot axle 78 may be located a distance D1 (FIG. 5) of approximately 36 inches from the second end 50, and about 60 inches from the first end 48 of the load carrier 40. This will assure that the center of gravity CG will be located on the first end 48 side of the pivot axle 78 even when a load of material 46 is being carried which is longer than the length L1 of the load carrier 40. The extra weight of the end wall structure 52 and plates 64, 74 will overcome the weight of the open second end 50 when a load of 10 feet in length is carried in the load carrier 40.

The cart frame 12 may have an outside width W2 (FIG. 4) of about 30 inches which will allow it to be easily moved through doorways and hallways. When the cart frame is made from 2 inch square tubing, there is an inside clearance IC (FIG. 4) between the side walls of the cart frame of about 26 inches. When the load carrier 40 is then made with a width W1 of about 26 inches, it is permitted to nest within the side walls 44 of the cart frame 12 as the load carrier pivots, as shown in FIG. 1. The overall length L2 (FIG. 4) of the cart frame 12 can be about 6 feet with the pivot axle 78 located at a distance D2 (FIG. 4) of about 20 inches from the rear end 36 of the cart frame. A height H2 (FIG. 3) of the vertical frame members may be about 45 inches and the wheels may be about 8 inches tall, including mounting elements.

While a particular embodiment of the present transport cart has been described herein, it will be appreciated by those skilled in the art that changes and modifications may be made thereto without departing from the invention in its broader aspects and as set forth in the following claims.

The invention claimed is:

1. A transport cart comprising:
    a cart frame having wheels for engaging the ground,
    a load carrier having a bottom and side wall structure for supporting a load of materials to be transported by said transport cart and an end wall structure at a first end of said load carrier, opposite a second end of said load carrier, for supporting the load of materials,
    a pivot axle arranged transversely between said cart frame and said load carrier to permit said load carrier to pivot relative to said cart frame about a single axis, said pivot axle being disposed closer to the second end of said load carrier than the first end of said load carrier,
    an interfering stop structure arranged on said cart frame and said load carrier to prevent pivotal movement of said load carrier in one direction relative to said cart frame beyond a predetermined angle,
    said load carrier having a center of gravity located between said first and second ends and said pivot axle being arranged on said load carrier, relative to said center of gravity, towards said second end of said load carrier, and
    a force applying device arranged between said cart frame and said load carrier to provide a pulling force on said load carrier between said pivot axle and said second end of said load carrier and towards said cart frame, such that said force applying device will cause said load carrier to pivot relative to said cart frame upon the application of a predetermined amount of force, said force applying device including an arrest mechanism arranged to arrest pivotal movement of said load carrier relative to said cart frame in a direction opposite of said pulling force, unless said arrest mechanism is specifically released by a user of said transport cart.

2. A transport cart according to claim 1, wherein said load carrier bottom and side walls are formed by open frame members.

3. A transport cart according to claim 1, wherein said end wall structure at said first end of said load carrier comprises a plate extending between frame members of said load carrier.

4. A transport cart according to claim 1, wherein said second end of said load carrier is open.

5. A transport cart according to claim 1, wherein said pivot axle is welded to one of the cart frame and the load carrier.

6. A transport cart according to claim 1, wherein said interfering stop comprises a frame element of said cart frame and a frame element of said load carrier which engage upon a pivoting of said load carrier relative to said cart frame when the first end of said load carrier moves downwardly toward one end of said cart frame.

7. A transport cart according to claim 1, wherein said load carrier is pivotable between a horizontal position and an angled position where said first end of said load carrier is lower than said second end of said load carrier.

8. A transport cart according to claim 1, wherein said force applying device comprises a winch mounted on said cart frame and a cable extending from said winch to said load carrier.

9. A transport cart according to claim 8, wherein said winch is manually operated by means of a crank.

10. A transport cart according to claim 8, wherein said winch includes a ratchet gear and pawl to allow for one way rotation of said winch and to arrest reverse rotational movement of said winch.

11. A transport cart according to claim 1, wherein said cart frame includes two spaced apart side structures and wherein said load carrier is sized to nest between said side structures of said cart frame in some rotational positions of said load carrier relative to said cart frame.

12. A transport cart comprising:
    a cart frame having wheels for engaging the ground,
    a load carrier having a bottom wall structure for supporting a load of materials to be transported by said transport cart and an end wall structure at a first end of said load carrier, opposite a second end of said load carrier, for supporting the load of materials,
    a pivot axle arranged between said cart frame and said load carrier to permit said load carrier to pivot relative to said cart frame about a single axis, said pivot axle being disposed closer to the second end of said load carrier than the first end of said load carrier, said load carrier having a center of gravity located between said first and second ends and said single axis pivot axle being secured to said load carrier, relative to said center of gravity, towards said second end of said load carrier, and a force applying device arranged between said cart frame and said load carrier to provide a force to said load carrier relative to said cart frame, such that said force applying device will cause said load carrier to pivot relative to said cart frame upon the application of a predetermined amount of force, wherein said force applying device provides a pulling force against said load carrier.

13. A transport cart according to claim 12, further comprising an interfering stop structure arranged on said cart frame and said load carrier to prevent pivotal movement of said load carrier in one direction relative to said cart frame beyond a predetermined angle, wherein said interfering stop comprises a frame element of said cart frame and a frame element of said load carrier which engage upon a pivoting of said load carrier relative to said cart frame when the first end of said load carrier moves downwardly toward one end of said cart frame.

14. A transport cart according to claim 12, wherein said force applying device comprises a winch mounted on said cart frame and a cable extending from said winch to said load carrier.

15. A transport cart according to claim 12, wherein said cart frame includes two spaced apart side structures and wherein said load carrier is sized to nest between said side structures of said cart frame in some rotational positions of said load carrier relative to said cart frame.

16. A transport cart comprising:
a cart frame having wheels for engaging the ground,
a load carrier having a bottom wall structure for supporting a load of materials to be transported by said transport cart and an end wall structure at a first end of said load carrier, opposite a second end of said load carrier, for supporting the load of materials,
said cart frame and said load carrier being secured to a single pivot axle to permit said load carrier to pivot relative to said cart frame about a longitudinal axis of said pivot axle, said pivot axle being disposed closer to the second end of said load carrier than the first end of said load carrier,
said load carrier having a center of gravity located between said first and second ends and said pivot axle being secured to said load carrier, relative to said center of gravity, towards one of said first and second ends of said load carrier, and
a force applying device carried on said cart frame with a portion extending to said load carrier to provide a pulling force between said cart frame and a point on said load carrier between said pivot axle and said one of said first and second ends of said load carrier, such that said force applying device will cause said load carrier to pivot relative to said cart frame upon the application of a predetermined amount of force, said portion extending to said load carrier remaining in tension in all angular positions of said load carrier, said force applying device including an arrest mechanism arranged to arrest pivotal movement of said load carrier relative to said cart frame in a direction opposite of said pulling force, unless said arrest mechanism is released by a user of said transport cart.

17. A transport cart according to claim 16, further comprising an interfering stop structure arranged on said cart frame and said load carrier to prevent pivotal movement of said load carrier in one direction relative to said cart frame beyond a predetermined angle, wherein said interfering stop comprises a frame element of said cart frame and a frame element of said load carrier which engage upon a pivoting of said load carrier relative to said cart frame when the first end of said load carrier moves downwardly toward one end of said cart frame.

18. A transport cart according to claim 16, wherein said load applying device comprises a winch mounted on said cart frame and a cable extending from said winch to said load carrier.

19. A transport cart according to claim 16, wherein said cart frame includes two spaced apart side structures and wherein said load carrier is sized to nest between said side structures of said cart frame in some rotational positions of said load carrier relative to said cart frame.

* * * * *